(12) United States Patent
Ishii et al.

(10) Patent No.: US 8,503,775 B2
(45) Date of Patent: Aug. 6, 2013

(54) IMAGE PROCESSING METHOD AND IMAGE PROCESSING APPARATUS

(75) Inventors: Maya Ishii, Kawasaki (JP); Yoshinori Kawai, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1192 days.

(21) Appl. No.: 12/144,882

(22) Filed: Jun. 24, 2008

(65) Prior Publication Data

US 2009/0003696 A1    Jan. 1, 2009

(30) Foreign Application Priority Data

Jun. 29, 2007 (JP) ................................. 2007-172761

(51) Int. Cl.
*G06K 9/00* (2006.01)
(52) U.S. Cl.
USPC .......................................... 382/167; 382/162
(58) Field of Classification Search
None
See application file for complete search history.

(56) References Cited

U.S. PATENT DOCUMENTS

| | | | | |
|---|---|---|---|---|
| 7,034,844 B2 | 4/2006 | Akiyama et al. | ............... | 345/590 |
| 7,251,360 B2 * | 7/2007 | Takahashi | ..................... | 382/167 |
| 2006/0028665 A1 | 2/2006 | Kawai | ........................... | 358/1.9 |
| 2007/0035754 A1 * | 2/2007 | Hori et al. | ...................... | 358/1.9 |
| 2007/0252850 A1 * | 11/2007 | Fujiwara et al. | .............. | 345/604 |
| 2008/0018962 A1 | 1/2008 | Kawai | ........................... | 358/522 |

FOREIGN PATENT DOCUMENTS

| | | |
|---|---|---|
| JP | 2002-77659 A | 3/2002 |
| JP | 2003-92690 | 3/2003 |
| JP | 2003-153027 | 5/2003 |
| JP | 2004-246674 | 9/2004 |
| JP | 2007-124243 | 5/2007 |

* cited by examiner

*Primary Examiner* — Jason M Repko
*Assistant Examiner* — David Perlman
(74) *Attorney, Agent, or Firm* — Fitzpatrick, Cella, Harper & Scinto

(57) ABSTRACT

One embodiment of the present invention is to provide an image processing method and an image processing apparatus which can also handle data other than a standard color space and can also handle a case in which the color space of an image color adjustment processing section and that of an image color conversion processing section are different from each other. In one embodiment of the present invention, predetermined color conversion is performed on an image in a first color space, and a first color conversion table defined in the first color space is generated. Next, based on the first color conversion table, a second color conversion table defined in a second color space is generated.

22 Claims, 11 Drawing Sheets

FIG.8A

| INPUT VALUE | | | OUTPUT VALUE | | |
|---|---|---|---|---|---|
| R | G | B | R' | G' | B' |
| 0 | 0 | 0 | 0 | 0 | 5 |
| 0 | 0 | 16 | 3 | 2 | 17 |
| 0 | 0 | 32 | 2 | 2 | 31 |
| 0 | 0 | 48 | 0 | 1 | 45 |
| . | . | . | . | . | . |
| . | . | . | . | . | . |
| . | . | . | . | . | . |
| 255 | 255 | 238 | 240 | 248 | 237 |
| 255 | 255 | 255 | 254 | 255 | 255 |

FIG.8B

| H | S | L |
|---|---|---|
| 0 | 0 | 0 |
| 0 | 0 | 5 |
| 0 | 0 | 10 |
| 0 | 0 | 15 |
| . | . | . |
| . | . | . |
| . | . | . |
| 355 | 180 | 95 |
| 355 | 180 | 100 |

FIG.8C

INPUT VALUE

| R | G | B |
|---|---|---|
| 0 | 0 | 0 |
| 16 | 16 | 16 |
| 27 | 27 | 27 |
| 37 | 37 | 37 |
| . | . | . |
| . | . | . |
| . | . | . |
| 253 | 0 | 253 |
| 255 | 0 | 255 |

FIG.8D

| INPUT VALUE | | | OUTPUT VALUE | | |
|---|---|---|---|---|---|
| R | G | B | R' | G' | B' |
| 0 | 0 | 0 | 0 | 0 | 5 |
| 16 | 16 | 16 | 17 | 14 | 18 |
| 27 | 27 | 27 | 22 | 24 | 31 |
| 37 | 37 | 37 | 35 | 34 | 39 |
| . | . | . | . | . | . |
| . | . | . | . | . | . |
| . | . | . | . | . | . |
| 253 | 0 | 253 | 240 | 10 | 250 |
| 255 | 0 | 255 | 254 | 7 | 255 |

FIG.8E

| INPUT VALUE | | | OUTPUT VALUE | | |
|---|---|---|---|---|---|
| H | S | L | H' | S' | L' |
| 0 | 0 | 0 | 0 | 0 | 0 |
| 0 | 0 | 5 | 17 | 14 | 18 |
| 0 | 0 | 10 | 22 | 24 | 31 |
| 0 | 0 | 15 | 35 | 34 | 39 |
| . | . | . | . | . | . |
| . | . | . | . | . | . |
| . | . | . | . | . | . |
| 355 | 180 | 95 | 240 | 10 | 250 |
| 355 | 180 | 100 | 254 | 7 | 255 |

IMAGE PROCESSING METHOD AND IMAGE PROCESSING APPARATUS

BACKGROUND OF THE INVENTION

1. Field of the Invention

The present invention relates to an image processing method and an image processing apparatus. More particularly, it relates to an image processing method and an image processing apparatus, in which a color conversion table utilized for color conversion processing of an image input device such as, for example, a scanner and a digital still camera (hereinafter, simply referred to as camera), is generated and color conversion processing is performed using the color conversion table.

2. Description of the Related Art

A method by which a user performs favorite color conversion on an input image obtained from a scanner or a camera is disclosed in Japanese Patent Laid-Open No. 2002-077659. In Japanese Patent Laid-Open No. 2002-077659, a method by which a user performs color adjustment of a sample image while watching a display device, and performs favorite color conversion by generating a multi-dimensional color conversion table based on the result of the color adjustment, is proposed. In other words, Japanese Patent Application Laid-Open No. 2002-077659, discloses that, in an image color adjustment processing section, a three-dimensional LUT is generated in response to the color adjustment performed by the user, and the image color conversion processing section performs color conversion processing favored by the user, based on the three-dimensional LUT.

As for a camera, conventionally, many data in sRGB (hereinafter referred to as a standard color space) has been treated, however, in recent years, not only the data in the standard color space but also many data in Adobe RGB, Wide Gamut RGB or the like (hereinafter referred to as an expanded color space) has come to be treated. However, in many conventional methods, not the data in the expanded color space, but the data in the standard color space is used as an object of color conversion, and the object corresponds to a single color space.

Specifically, in a conventional method such as Japanese Patent Laid-Open No. 2002-077659, color adjustment of a sample image is performed while watching a display device, and a color conversion table is generated based on the data of color adjustment, but most of the display devices generally used treat the data in the standard color space. Therefore, when a favorite color conversion is performed on the data in the expanded color space, since the result can not be correctly displayed on the display device, it is difficult to perform color adjustment intended by a user. In addition, it is also difficult to generate a color conversion table responding to the expanded color space.

Moreover, in the conventional method, only an image of the same color space as that of the image used for performing color adjustment is caused to be an object of color conversion. Also in Japanese Patent Laid-Open No. 2002-077659, the image color conversion processing section also performs color conversion by directly using a three dimensional LUT generated by the image color adjustment processing section. In other words, even if the color conversion table generated using the image in the standard color space is tried to be applied to the image of an expanded color space, since it does not respond to colors outside the color gamut of the standard color space, it is difficult to perform color conversion on colors outside the standard color space.

As mentioned above, in a conventional method, there is a problem in that when the color space of a sample image is different from that of the display device, it is difficult to perform color adjustment while watching the display device. Moreover, there is also a problem in that, the method cannot handle a case in which the color space of the image color adjustment processing section for performing color adjustment of an image and the color space of the image color conversion processing section for performing color conversion of the image are different from each other.

Moreover, along with the advance of a recent image processing technology and a printing technology, there is a demand to perform displaying on a display or printing in a color space with a color gamut widened in response to the desire of a user. In other words, it is desired that color conversion can be performed not only in a first color space (for example, a standard color space), but also in a second color space (an expanded color space) different from the first color space.

SUMMARY OF THE INVENTION

The present invention is made to solve the above-mentioned problems. An object of the present invention is to perform a predetermined color adjustment on an image in a first color space, generate a first color conversion table defined in the first color space, and generate a second color conversion table defined in the second color space, based on the first color conversion table.

Another object of the present invention is to enable color adjustment of a sample image to be performed easily by using the sample image in the same color space as that of the display device, in the image color adjustment processing section. Along with this, further object of the present invention is to provide an image processing method and an image processing apparatus which can handle also a case in which the color space of the image color adjustment processing section and the color space of the image color conversion processing section are different from each other.

In one aspect of the present invention, an image processing method comprising: an image color adjustment processing step of performing predetermined color adjustment on an image in a first color space to generate a first color conversion table defined in the first color space; and a color conversion table generation processing step of generating a second color conversion table defined in a second color space, based on the first color conversion table, is provided.

In another aspect of the present invention, an image processing apparatus comprising: an image color adjustment means for performing predetermined color adjustment on an image in a first color space to generate a first color conversion table defined in the first color space; and a color conversion table generation means for generating a second color conversion table defined in a second color space, based on the first color conversion table, is provided.

According to the present invention, the following effects can be obtained. In other words, based on the color conversion table defined in the first color space (for example, the standard color space), a table defined in the second color space (the expanded color space) that is different from the first color space, can be generated. As a result, color conversion reflecting a conversion characteristic defined by the first color conversion table can be achieved, on an image of the second color conversion.

Further features of the present invention will become apparent from the following description of exemplary embodiments (with reference to the attached drawings).

BRIEF DESCRIPTION OF THE DRAWINGS

FIGS. 8A to 8E are a view illustrating the details of an LUT according to an embodiment of the present invention, generated in automatic color conversion table generation processing;

DESCRIPTION OF THE EMBODIMENTS

Figure 1:
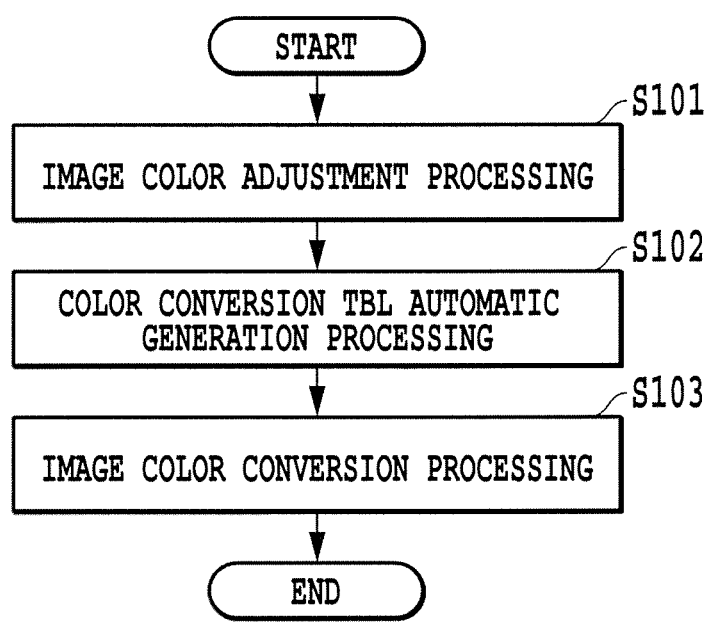
FIG. 1 is a flow chart illustrating processing procedures according to an embodiment of the present invention, for generating a second color conversion table defined in a second color space from a first color conversion table defined in a first color space.

Hereinafter, with reference to drawings, embodiments of the present invention will be described in detail. In addition, in the drawings described below, elements with the same function are denoted by the same reference numeral, and duplicated descriptions thereof will be omitted.

In an embodiment of the present invention, based on a first color conversion table generated in a first color space, a second color conversion table of a second color space that is different from the first color space is automatically generated, and color conversion is performed in the second color space, using the second color conversion table. In other words, the image processing apparatus according to an embodiment of the present invention generates the second color conversion table defined in the second color space, based on the first color conversion table defined in the first color space.

In addition, the second color space is caused to have a color gamut wider than that of the first color space. Therefore, the color conversion table defined in the second color space is a color conversion table generated by expandedly defining the color conversion table defined in the first color space.

The image processing apparatus according to an embodiment of the present invention is not limited to, but realized as, for example, a personal computer, and includes a CPU which executes control processing of operation or data processing etc. of the image processing apparatus. Moreover, the image processing apparatus further includes a memory having a ROM for storing programs of processing procedures etc., and a RAM used as a work area etc. for executing these processing.

Moreover, the image processing apparatus is provided with an input operating section including a key board for inputting a predetermined command or data, or various switches etc.; a display device for displaying various objects, such as an input image or setting state of the image processing apparatus. The display device is a color display device such as an LCD monitor corresponding to the first color space.

Moreover, the image processing apparatus can be connected to an image input device, such as a scanner or a digital camera. An image, such as a sample image mentioned later, is input by such a connection. In addition, in an embodiment of the present invention, any image input unit except for the image input device may be used as long as it can input an image, such as a sample image. For example, by providing a network interface, the image may also be input from another device such as a PC or a scanner through a network. Moreover, by providing a magnetic drive or an optical disk drive, the image may also be input by the magnetic disk or the optical disk in which an image such as a sample image is stored.

Further, the image processing apparatus can be connected to an image output device such as a printer. The image output device may be an image forming device in any system such as an electrophotographic system or an ink-jet system, and may be a display such as a monitor. Moreover, the image output device may be a device corresponding to the first color space, or a device corresponding to the second color space.

FIG. 1 is a flow chart illustrating the processing procedure according to an embodiment of the present invention, for generating a second color conversion table defined in a second color space from a first color conversion table defined in a first color space. The CPU equipped by the image processing apparatus reads out a program stored in a memory and executes the following operations according to the flow chart illustrated in FIG. 1.

At Step S101, predetermined color conversion is performed on the input image in the first color space, and a color conversion table defined in the first color space is generated (hereinafter referred to as image color adjustment processing).

In an example (corresponding to a first embodiment) of an image color adjustment processing, the image processing apparatus displays the image in the first color space using a display device such as an LCD monitor having a color gamut of the first color space. If a user adjusts the color of an image using predetermined software while watching the display device, the image processing apparatus will generate the color conversion table (color conversion table defined in the first color space) of the first color space by making data of the result so that color conversion according to the color adjustment may be performed. In other words, the image processing apparatus performs color adjustment in response to the operation of the user on the image in the first color space to generate a color conversion table defined in the first color space.

Here, the display device is a generally and widely used device, and color chart data is included in the image to be subjected to color adjustment processing.

Moreover, in another example (corresponding to a second embodiment) of image color adjustment processing, an image processing apparatus obtains the color chart data as the expression characteristic of a color of the image in the first color space input through a portable medium such as a magnetic disk or an optical disk, or a network. Next, the image processing apparatus generates a table associated a data obtained by performing colorimetry of an output obtained by printing the color chart data by a printer and the obtained color chart data, and generates a color conversion table defined in the first color space.

At Step S102, a color conversion table defined in the second color space is generated based on the color conversion table defined in the first color space (hereinafter referred to as a color conversion table (TBL) automatic generation processing).

In the color conversion table generation processing, the image processing apparatus generates a color conversion table (a color conversion table defined in the second color space) of the second color space, based on the color conversion table defined in the first color space generated in the image color adjustment processing.

In addition, in the present specification, "the color conversion table defined in the first color space" is a color conversion table applicable to the image in the first color space.

Moreover, in the present specification, "the color conversion table defined in the second color space" is a color conversion table that is generated by expandedly defining the color conversion table defined in the first color space so as to be applicable to an image in the second color space. In other words, it has a function to reflect color conversion performed on the image in the first color space, on the image in the second color space, thereby it can be applied to the image in the second color space.

It is effective to store the color conversion table defined in the second color space generated at Step S102 on a memory included in the image processing apparatus. By storing it in such a manner, color adjustment performed by the user on a certain image can be applied to another image. For example, it is effective in such a case that color adjustment is performed on a certain image in the first color space in a display device, the color adjustment is reflected on another image, and the resultant image is output from an image output device corresponding to the second color space. In this case, the image corresponding to the second color space can be output easily by merely reading out the color conversion table defined in the second color space from the memory, without obtaining it by calculation in each case. Of course, it is obvious that the color conversion table defined in the second color space may also be obtained by calculation in each case.

At Step S103, the color conversion table defined in the second color space is applied to the image in the second color space, and color conversion is performed on the above-mentioned image in the second color space (hereinafter, referred to as image color conversion processing).

In the image color conversion processing, the image processing apparatus applies the color conversion table defined in the second color space generated by the color conversion table generation processing to the image in the second color space, and performs color conversion. In addition, although, in FIG. 1, the color conversion table defined in the second color space at Step S102 is obtained by calculation and then the image color conversion processing is performed, the image color conversion processing may also be performed by reading out the color conversion table defined in the second color space, stored on the memory in advance.

The method of the embodiment of the present invention can handle even a case in which data in the second color space (for example, an expanded color space) which is not correctly displayed on a display device having color gamut of the first color space (for example, a standard color space) is input. In other words, a feature of a color conversion table generated with respect to data in the first color space can be reflected on a color conversion table corresponding to the second color space.

Specifically, in the color conversion table generation processing, by expanding a color conversion table generated for an image in sRGB, a color conversion table of Adobe RGB or Wide Gamut RGB can be generated. Therefore, color conversion can also be performed on the image in Adobe RGB or Wide Gamut RGB, which is almost equivalent to that of the image in sRGB.

Moreover, according to the embodiment of the present invention, even if the color space in image color adjustment processing differs from that in the image color conversion processing, in the color conversion table generation processing, a color conversion table corresponding to the color space in the image color conversion processing can be generated, based on the color conversion table generated in the image color adjustment processing. Therefore, the present invention can handle even a case in which the color space in image color adjustment processing differs from the color space in the image color conversion processing.

First Embodiment

In the present embodiment, description will be made by setting sRGB and Adobe RGB in a first color space and in a second color space, respectively.

Figure 2:
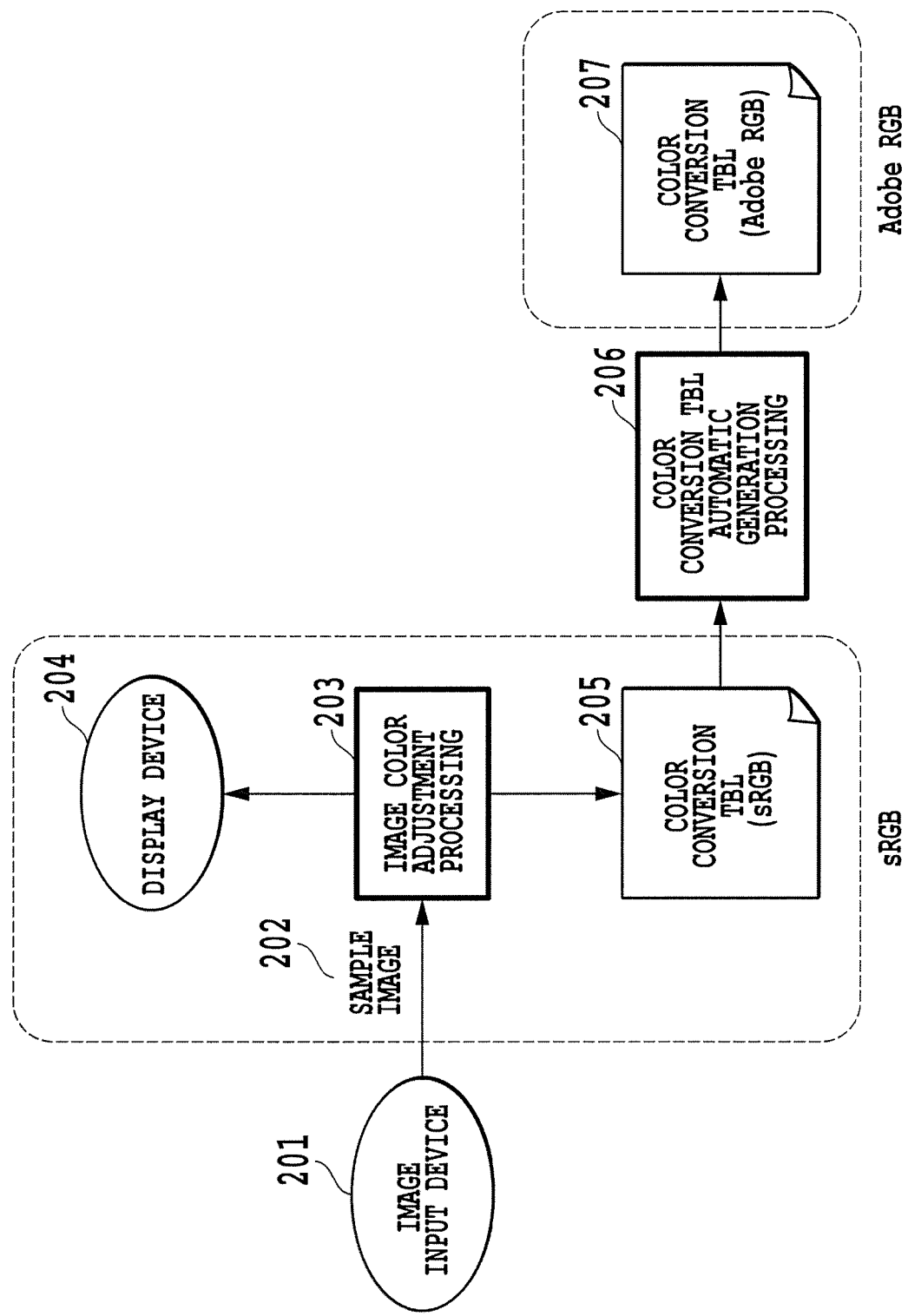
FIG. 2 is a schematic view of an image processing apparatus according to an embodiment of the present invention.

FIG. 2 is a block diagram illustrating "processing from generation of a color conversion table (TBL) corresponding to sRGB to automatic generation of a color conversion TBL corresponding to Adobe RGB."

In FIG. 2, the image processing apparatus includes an image color adjustment processing section 203, a display device 204 supporting sRGB, and a color conversion table (TBL) generation processing section 206. Moreover, an image input device 201 such as a camera or a scanner is connected to the image processing apparatus. The image input device 201 supports sRGB, and the image input from the image input device 201 is an image in sRGB.

Moreover, the image processing apparatus includes a controlling section (not illustrated in figures) for controlling the whole of the image processing apparatus, and the controlling section has a CPU (not illustrated in the figure) for executing control processing of operation of the image processing apparatus, or data processing, etc. Moreover, the controlling section also includes a memory having a ROM for storing programs of, such as each processing procedure, and a RAM used as a work area etc. for executing these processing. Configurations illustrated in FIG. 2 are also controlled by the controlling section in an integrated manner.

As an input image, a sample image 202 is input into an image color conversion processing section 203 from the image input device 201. First, the image color adjustment processing section 203 displays the input sample image 202 on a display device 204. Here, the display device 204 is intended to be a generally used device such as an LCD monitor, and to have the same color space as that of the input sample image 202. Here, it is intended to use sRGB as the color spaces of the sample image 202 and the display device 204.

If the sample image is displayed on the display device 204, a user will perform retouch processing while watching the sample image 202 displayed on the display device 204 by photo retouch software etc. After the retouch processing by the user is finished, the image color adjustment processing section 203 generates a color conversion TBL (sRGB) 205 as a color conversion table (TBL) defined in the first color space from the sample image 202 and the retouched image.

The generated color conversion TBL (sRGB) 205 is input into a color conversion table generation processing section 206, and obtains a color conversion TBL (Adobe RGB) 207 as the output. In other words, the color conversion table generation processing section 206 generates the color conversion TBL (Adobe RGB) 207 as a color conversion table defined in the second color space, based on the color conversion TBL (sRGB) output from the image color adjustment processing section 203. The color conversion TBL (Adobe RGB) 207 thus obtained is memorized on the memory possessed by the controlling section.

The details of the processing sections will be described later. The description so far is the processing from generation of the color conversion TBL (color conversion table defined in the first color space) supporting sRGB to automatic generation of the color conversion TBL (color conversion table defined in the second color space) supporting Adobe RGB.

Figure 3:
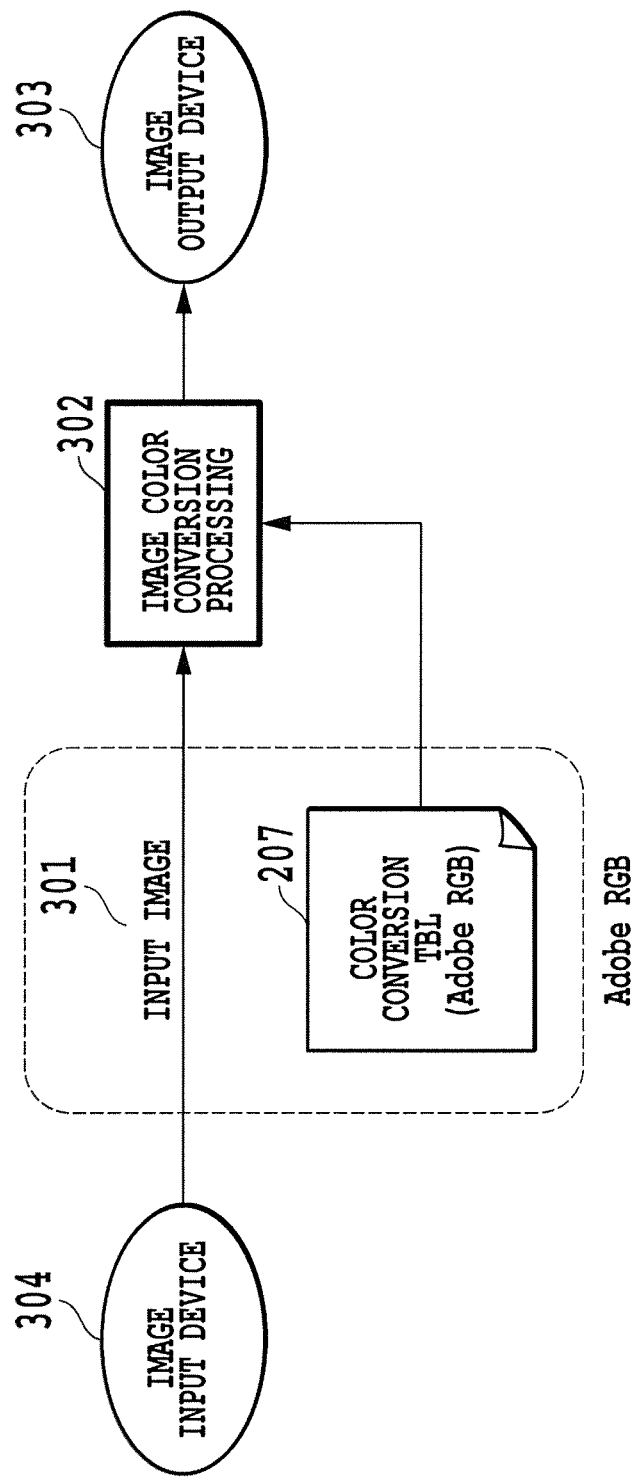
FIG. 3 is a schematic view of an image processing apparatus according to an embodiment of the present invention.

FIG. 3 illustrates processing for applying the color conversion TBL supporting Adobe RGB automatically generated by "processing from generation of the color conversion TBL supporting sRGB to automatic generation of the color conversion TBL supporting Adobe RGB" described in FIG. 2 to the input image in the color space of Adobe RGB.

In FIG. 3, the image processing apparatus includes an image color conversion processing section 302. An image input device 304 such as a camera and a scanner is connected to the image processing apparatus. The image input device 304 supports Adobe RGB, and the image input from the image input device 304 is an image of Adobe RGB. Further, an image output device 303 supporting Adobe RGB is connected to the image processing apparatus.

From the image input device 304, the input image 301 expressed in the color space of Adobe RGB is input into the image color conversion processing section 302. The color conversion TBL (Adobe RGB) 207 indicates the color conversion TBL finally obtained by the processing shown in FIG. 2, and it is read from the memory and input into the image color conversion processing section 302.

The image color conversion processing section 302 performs color conversion on the input image 301 input using the color conversion TBL (Adobe RGB) 207, and inputs the converted image (conversion image) into the image output device 303. The image output device 303 indicates, for example, a printer or a monitor supporting Adobe RGB, and outputs the input conversion image.

Figure 4:
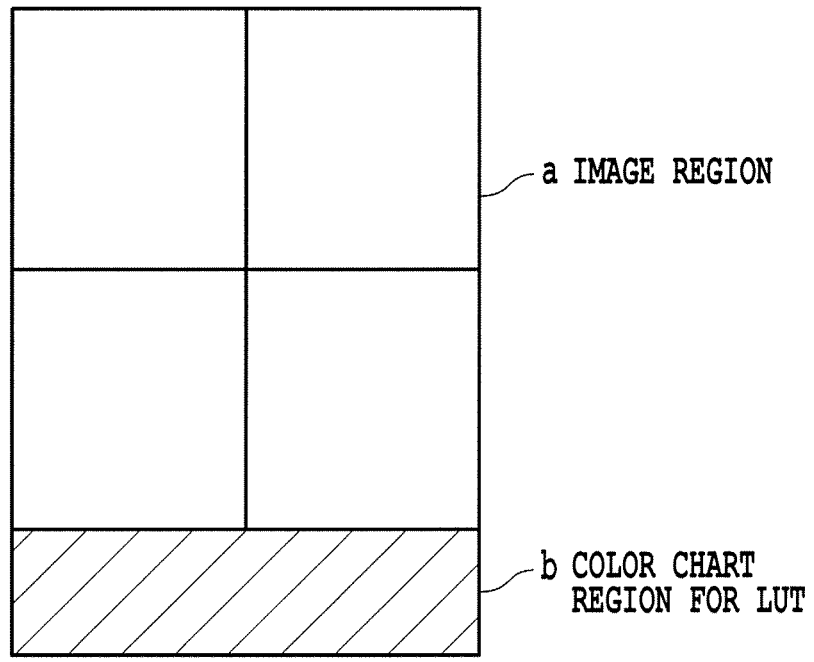
FIG. 4 is a view illustrating the details of a sample image according to an embodiment of the present invention.

FIG. 4 is a view illustrating the details of the sample image 202 shown in FIG. 2. Region a is an image range and Region b is a color chart region for LUT. In this manner, by providing the color chart region for LUT in a part of an image, color chart data for LUT is prepared in advance.

As for the color chart data for LUT, for example, in an LUT of 16×16×16, arranged data is used, in which the following RGB values are equally divided:

RGB=(0,0,0),(0,0,16), . . . (0,0,239),(0,0,255),(0,16,0),(0,16,16), . . . (255,255,255)

Alternatively, data in which hue, saturation and lightness are equally divided in the color gamut of sRGB, may be used.

Figure 5:
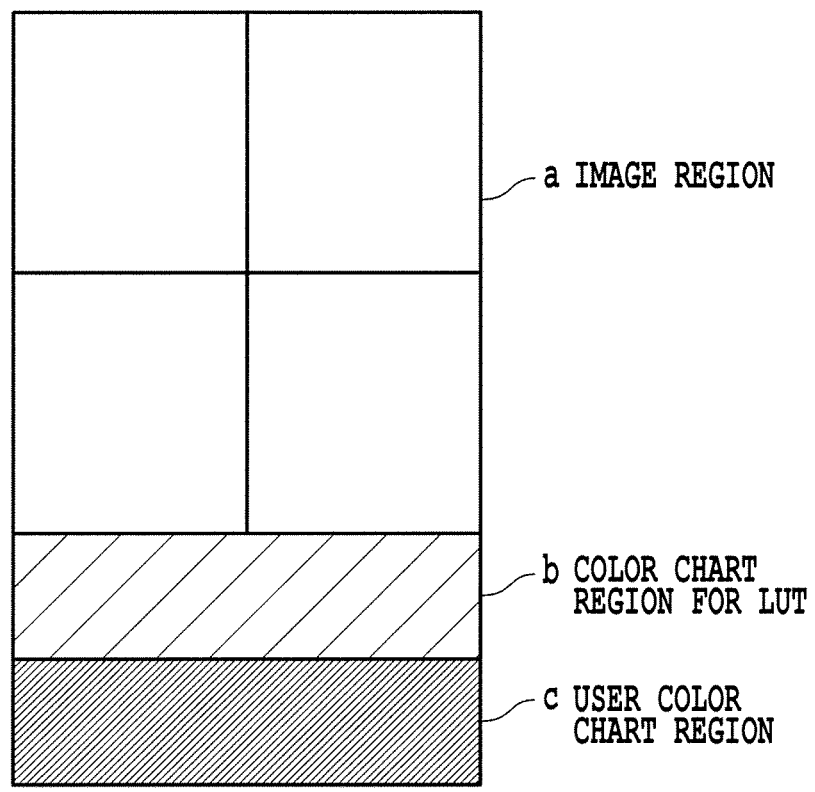
FIG. 5 is a view illustrating the details of a sample image according to an embodiment of the present invention.

Moreover, as illustrated in FIG. 5, in a sample image, other than the above-mentioned color chart region b for LUT, a region for another color chart data (user color chart region c) may be prepared. By preparing a region in such a manner, it is also possible for a user to pick up a color among the sample image, the color to which the user wants to adjust arbitrarily in high accuracy, and to set it as user color chart data.

Figure 6:
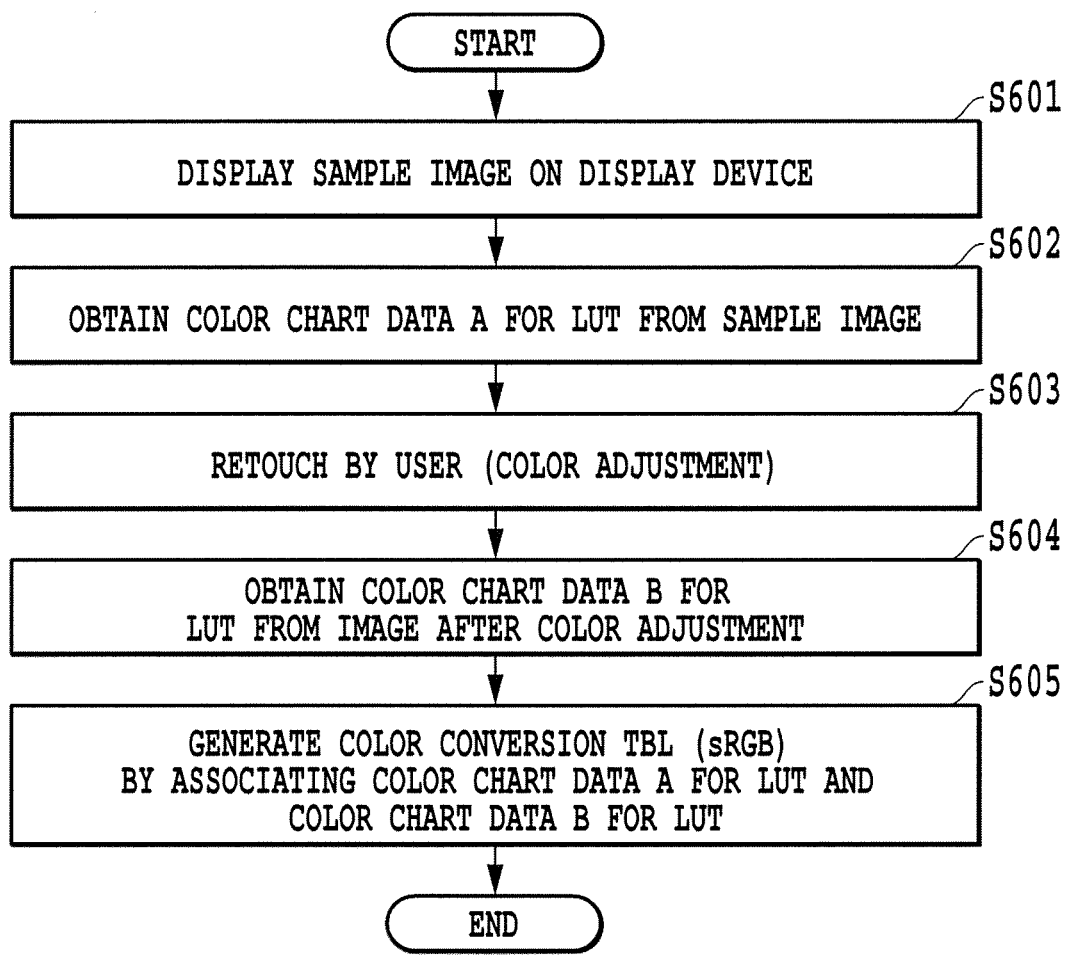
FIG. 6 is a flow chart illustrating the details of image color adjustment processing according to an embodiment of the present invention.

Next, the details of the image color adjustment processing performed by the image color adjustment processing section 203 illustrated in FIG. 2 will be described using the flow chart in FIG. 6.

At Step S601, the image color adjustment processing section 203 displays the sample image 202 on the display device 204, and proceeds to Step S602.

At Step S602, the image color adjustment processing section 203 obtains the RGB value of the color chart data A for LUT set at the color chart region b for LUT from the sample image 202, memorizes the RGB value of the obtained color chart data A for LUT in a memory, and proceeds to Step S603.

At Step S603, the image color adjustment processing section 203 changes the RGB value of the color chart region b for LUT in the sample image 202, in response to the retouch (color adjustment) to the sample image 202 displayed in the display device by a user, and proceeds to Step S604. In other words, the user performs retouch (color adjustment) by means of photo retouch software on the sample image 202, and the image color adjustment processing section 203 reflects the color adjustment on the color chart region b for LUT, and proceeds to Step S604 with the finish of the retouch. Meanwhile, this retouch (color adjustment) may be performed to all RGB value of the color chart region b or to a part of RGB value, according to user's instruction. Here, by the retouch of the user on the sample image 202, the RGB value of the color chart data for LUT set in the color chart region for LUT in the sample image 202 is also changed simultaneously.

At Step S604, the image color adjustment processing section 203 obtains the RGB value of the color chart data B for LUT set in the color chart region b for LUT from the image after subjected to color adjustment processing at Step S603. The image color adjustment processing section 203 memorizes the RGB value of the obtained color chart data B for LUT in the memory, and proceeds to Step S605.

At Step S605, the image color adjustment processing section 203 associates the RGB value of the color chart data A for LUT obtained at Step S602 and the RGB value of the color chart data B for LUT obtained at Step S604 with each other so that the RGB value of the color chart data A becomes an input and the RGB value of the color chart data B becomes an output. By associating in this way, the image color adjustment processing section 203 generates a color conversion TBL (sRGB) as a color conversion table defined in the first color space, memorizes the generated color conversion TBL (sRGB) in the memory, and finishes the processing.

By the above-mentioned processing, the image color adjustment processing section 203 generates the color conversion TBL (sRGB) 205 that is a three-dimensional LUT (multi-dimensional color conversion table).

Next, the details of the color conversion table generation processing performed by the color conversion table generation processing section 206 shown in FIG. 2 will be described, using the flow chart in FIG. 7 and FIGS. 8A to 8E.

At Step S701, the color conversion table generation processing section 206 loads the color conversion TBL (sRGB) 205 (hereinafter, referred to as TBL_A (RGB to RGB)), and proceeds to Step S702. Here, TBL_A (RGB to RGB) is the output value (sRGB) of R'G'B' for the input value (sRGB) of RGB which is equally divided, and illustrated in FIG. 8A.

At Step S702, the color conversion table generation processing section 206 has data in which hue, saturation and lightness (hereinafter, hue is designated by H; saturation is designated by S; and lightness is designated by L) as TBL_HSL, and proceeds to Step S703. Here, it is preferable for all of the divided intervals of H, S and L to be equal to each other, and it is suitable for them to have a numeral value of near 5. Here, values available for H, S and L are within the following ranges: $0<=H<2\pi$, $0<=S<=S_{max}$, and $0<=L<=100$, respectively. Maximum value $S_{max}$ of S is preferably a value containing the color gamut of Adobe RGB, and here it is set as 180. TBL_HSL generated as a result is shown in FIG. 8B. In other words, since, in the present embodiment, the second color space is Adobe RGB, TBL_HSL is generated so that H, S and L are compatible with Adobe RGB. In the present embodiment, it is important to apply the color conversion table generated in sRGB to Adobe RGB, and for this reason, TBL_HSL having H, S and L in Adobe RGB is used.

At Step S703, the color conversion table generation processing section 206 converts TBL_HSL generated at Step S702 into the RGB value of the sRGB color space, and generates TBL_sRGB. Here, when the data being greater than the color gamut of sRGB among data contained in TBL_HSL is converted into the RGB value of the sRGB, the value will be smaller than zero or greater than one (in the present embodiment, since 8-bit 256-gradation is used, the value will be smaller than zero or greater than 255). Hereinafter, such data will be dealt as data outside the sRGB color gamut. TBL_sRGB generated as a result is shown in FIG. 8C.

At Step S704, the color conversion table generation processing section 206 obtains an output value (sRGB) corresponding to a case where TBL_sRGB obtained at Step S703 is an input value. Specifically, the color conversion table generation processing section 206 obtains the output value (sRGB) by performing linear interpolation on TBL_A (RGB to RGB) of Step S701 by means of a known method (for example, such as tetrahedral interpolation), and generates a color conversion TBL_B (RGB to RGB). The generated color conversion TBL_B (RGB to RGB) is memorized in the memory. TBL_B (RGB to RGB) generated as a result is shown in FIG. 8D. However, the output value (values that are smaller than zero and greater than 255; not illustrated in FIG. 8D) when the input value of data is outside the sRGB color gamut is not defined.

In the present embodiment, data which is H, S and L data in Adobe RGB converted into the RGB data of sRGB is applied to the color conversion with regard to the color adjustment performed by the user using color conversion TBL_A (RGB to RGB). Therefore, the color conversion according to the color adjustment performed by the user in sRGB can be reflected on the color conversion table of Adobe RGB.

At Step S705, the color conversion table generation processing section 206 converts the color conversion TBL_B (RGB to RGB) generated at Step S704, and generates color conversion TBL_C (HSL to HSL) for causing the output values of H'S'L' to correspond to the input values of HSL. This conversion is realized by converting an input values and output values of the color conversion TBL_B (RGB to RGB) respectively into HSL. The generated color conversion TBL_C (HSL to HSL) is memorized in the memory. The TBL_C (HSL to HSL) generated as a result is shown in FIG. 8E. However, similar to the color conversion TBL_B (RGB to RGB), the output value (value that is smaller than zero or greater than 255; not illustrated in FIG. 8E) when the input value of data is outside the sRGB color gamut, is not defined.

At Step S706, the color conversion table generation processing section 206 extracts the data in the sRGB color gamut, in TBL_C (HSL to HSL) generated at Step S705.

At Step S707, the color conversion table generation processing section 206 determines the output value for the data determined to be outside the sRGB color gamut at Step S703 using the data in the sRGB color gamut obtained at Step S706. The way for the determination will be described below. If the determination is performed, the color conversion table generation processing section 206 will complete TBL_C (HSL to HSL), and finish the processing.

By the above-mentioned processing, the color conversion table generation processing section 206 generates a color conversion TBL (Adobe RGB) 207 based on the color conversion TBL (sRGB) 205 that is a three-dimensional LUT (multi-dimensional color conversion table).

Figure 7:
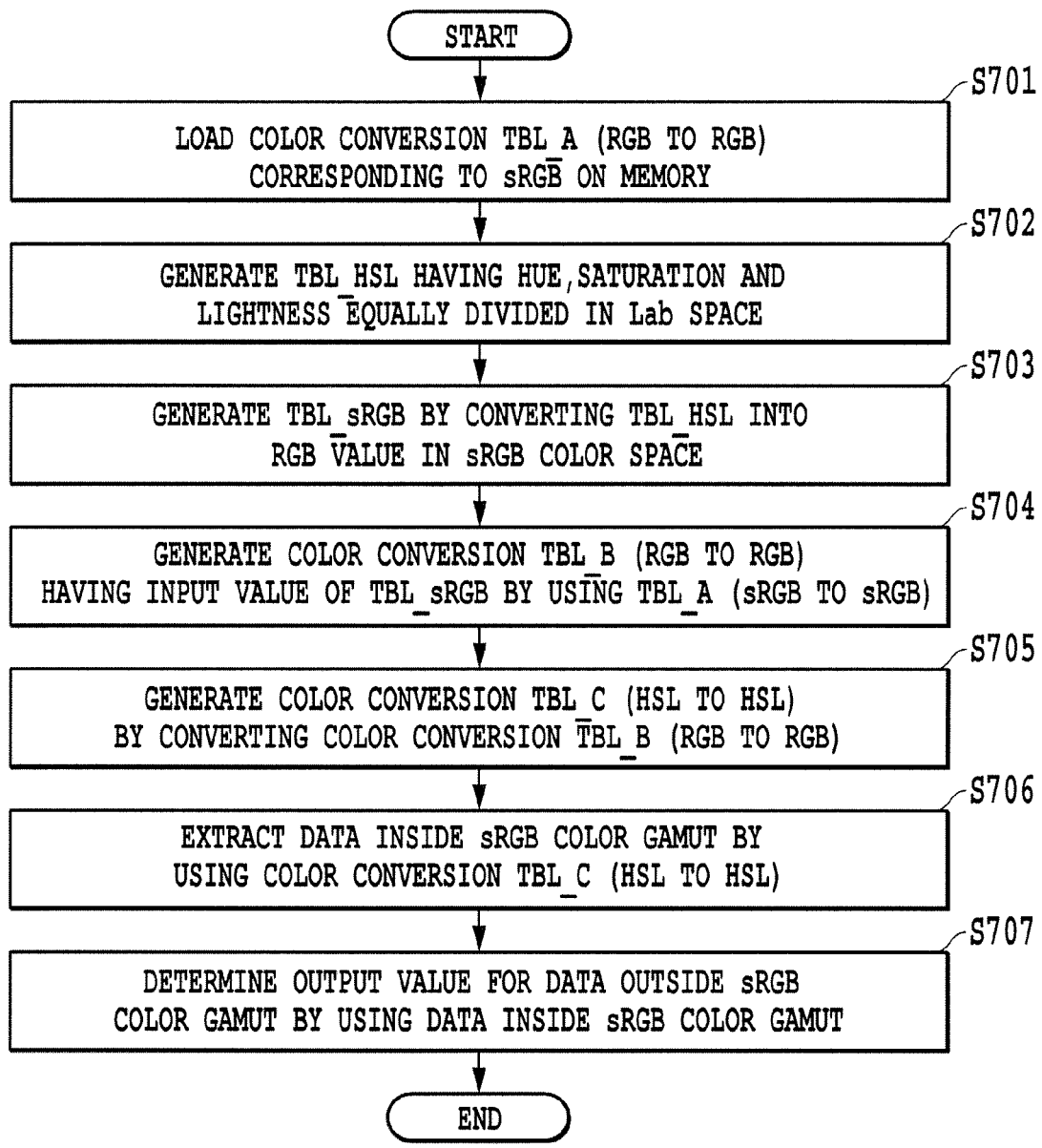
FIG. 7 is a flow chart illustrating a color conversion table generation processing according to an embodiment of the present invention.

Next, the details of Step S707 shown in FIG. 7 will be described with reference to FIGS. 9A to 9C. At Step S707, the color conversion table generation processing section 206 expandedly defines the data outside the sRGB color gamut, for each hue, saturation and lightness, using at least one of the data contained inside the sRGB color gamut in the color conversion TBL_B (RGB to RGB). In other words, using at least one data inside the sRGB color gamut, how the subjects of hue, saturation and lightness change, is obtained, and using the result, between the color gamut inside sRGB and the color gamut outside sRGB color are made to be smooth.

In addition, in the present embodiment, the predetermined data in the second color space is H, S and L in Adobe RGB. Therefore, the color conversion TBL_B (RGB to RGB) is data obtained by reflecting the color adjustment (color conversion) performed by the user on (applying the color conversion TBL_A (RGB to RGB) to) the H, S and L in Adobe RGB.

In the present embodiment, the color conversion table generation processing section 206 divides the data contained in the sRGB color gamut into hue, saturation and lightness, and performs analysis for the above-mentioned expanded definition for each of the hue, saturation and lightness as follows.

Figure 9A:
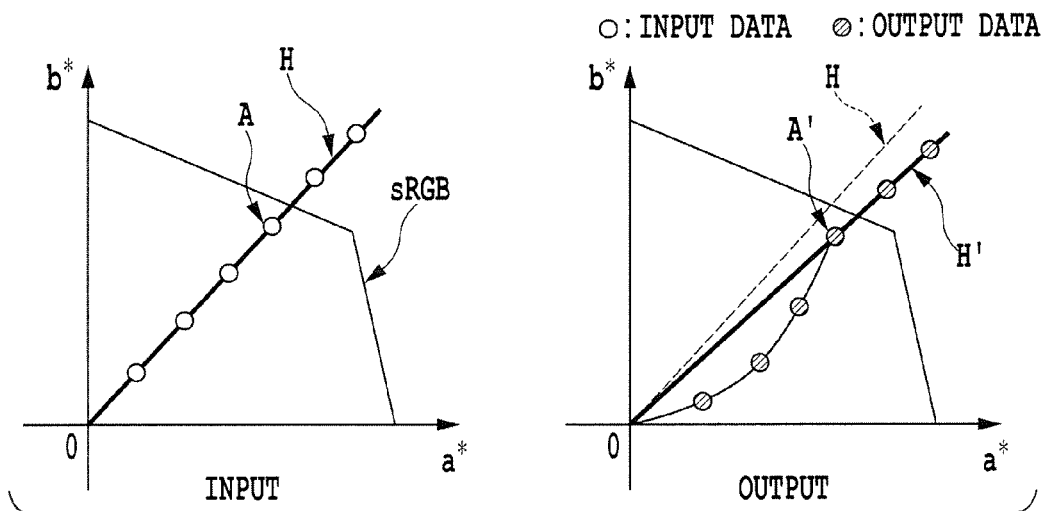
FIGS. 9A to 9C are a view illustrating a method according to an embodiment of the present invention, for generating an LUT corresponding to Adobe RGB smoothly expanded from sRGB color gamut.

First, a conversion method for hue is shown in FIG. 9A. Data A having highest saturation inside the sRGB color gamut in the input data, is focused attention, and all colors outside the sRGB color gamut are caused to have the hue H' of A' (the output of A).

In other words, in a method for performing expanded definition using hue, data(A) having highest saturation in arbitrary lightness and arbitrary hue, among data inside the sRGB color gamut (inside the first color space) is focused attention. The hue of the data(A') obtained as a result of applying the color conversion table defined in the first color space to the data is defined as the hue of data(H') obtained after performing color conversion on data(H) having the lightness and the hue among data that is not contained in the sRGB color gamut, but contained in the Adobe RGB color gamut.

Figure 9B:
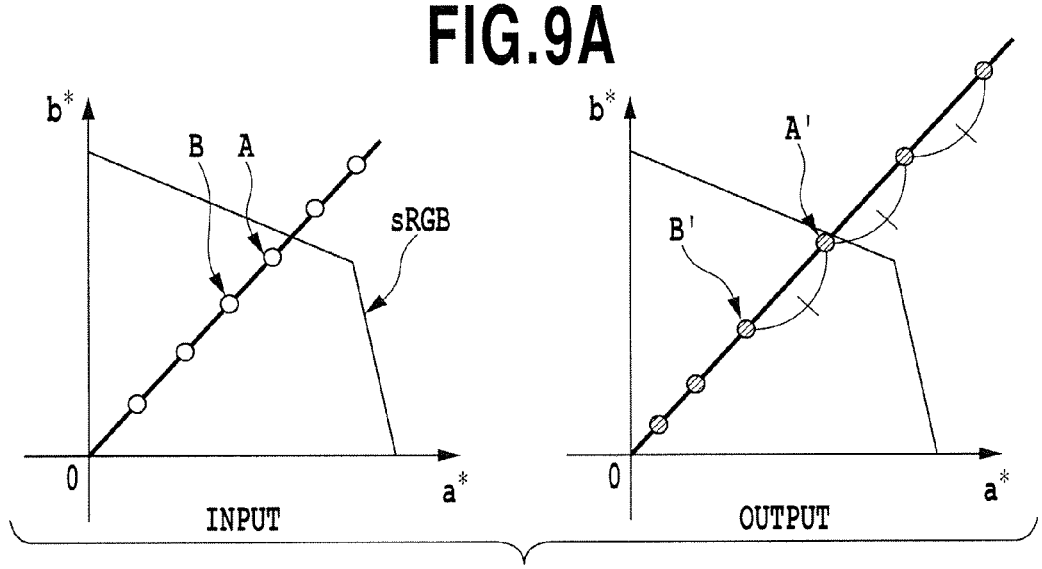

Next, a conversion method for saturation is shown in FIG. 9B. Data A having highest saturation inside the sRGB color gamut and data B having saturation lower than that of the data A among the input data are focused attention, and the output value for the data outside the sRGB color gamut is obtained by sequentially adding the difference between A' and B' (the output of B) to A'.

In other words, in the method for performing expanded definition using saturation, data(A) having highest saturation and data(B) having next highest saturation in arbitrary lightness and arbitrary hue among data inside the sRGB color gamut (the first color space) are focused attention. Based on data obtained as a result of applying the color conversion table defined in the first color space, the difference between the above-mentioned two data is calculated. Then, the calculated difference is sequentially added to data(A') having highest saturation obtained as a result of applying the color conversion table defined in the first color space. In this manner, in data that is not contained in the sRGB color gamut but contained in the Adobe RGB color gamut, the saturation of data obtained after performing color conversion on data having the lightness and hue is defined.

Figure 9C:
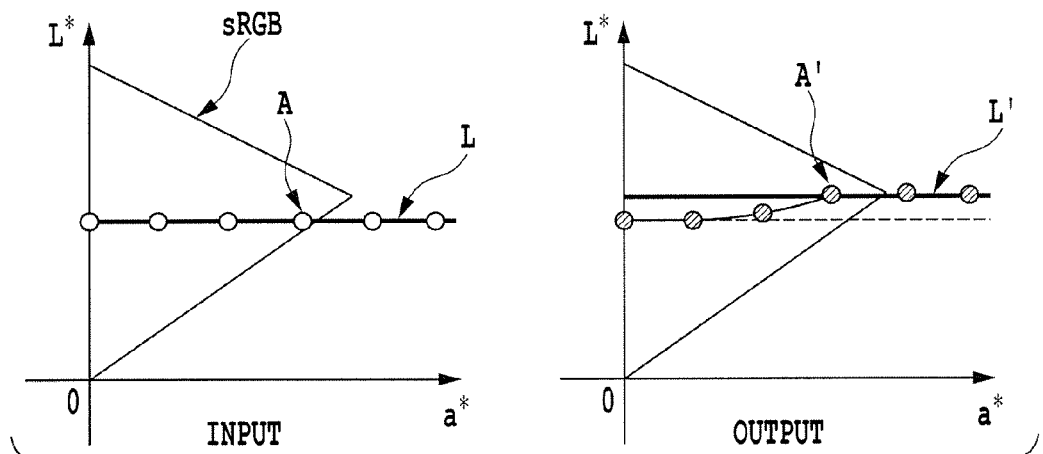

Next, a conversion method for lightness is shown in FIG. 9C. Similar to the case of hue, data A having highest saturation inside the sRGB color gamut in the input data is focused attention, and all colors outside the sRGB color gamut are caused to have the lightness L' of A'.

In other words, in the method for performing expanded definition using lightness, data(A) having highest saturation in arbitrary lightness and arbitrary hue among data inside the sRGB color gamut (the first color space) is focused attention. In data that is not contained in the sRGB color gamut but contained in the Adobe RGB color gamut, the lightness(L') of the data(A') obtained as a result of applying the color conversion table defined in the sRGB color gamut is defined as the lightness of data obtained after performing color conversion on data having the lightness and hue.

Then, by combining the output value for the input value outside the sRGB color gamut and the output value for the input value inside the sRGB color gamut, color conversion TBL (Adobe RGB) 207 that is a three-dimensional LUT compatible with Adobe RGB can be generated.

Figure 10:
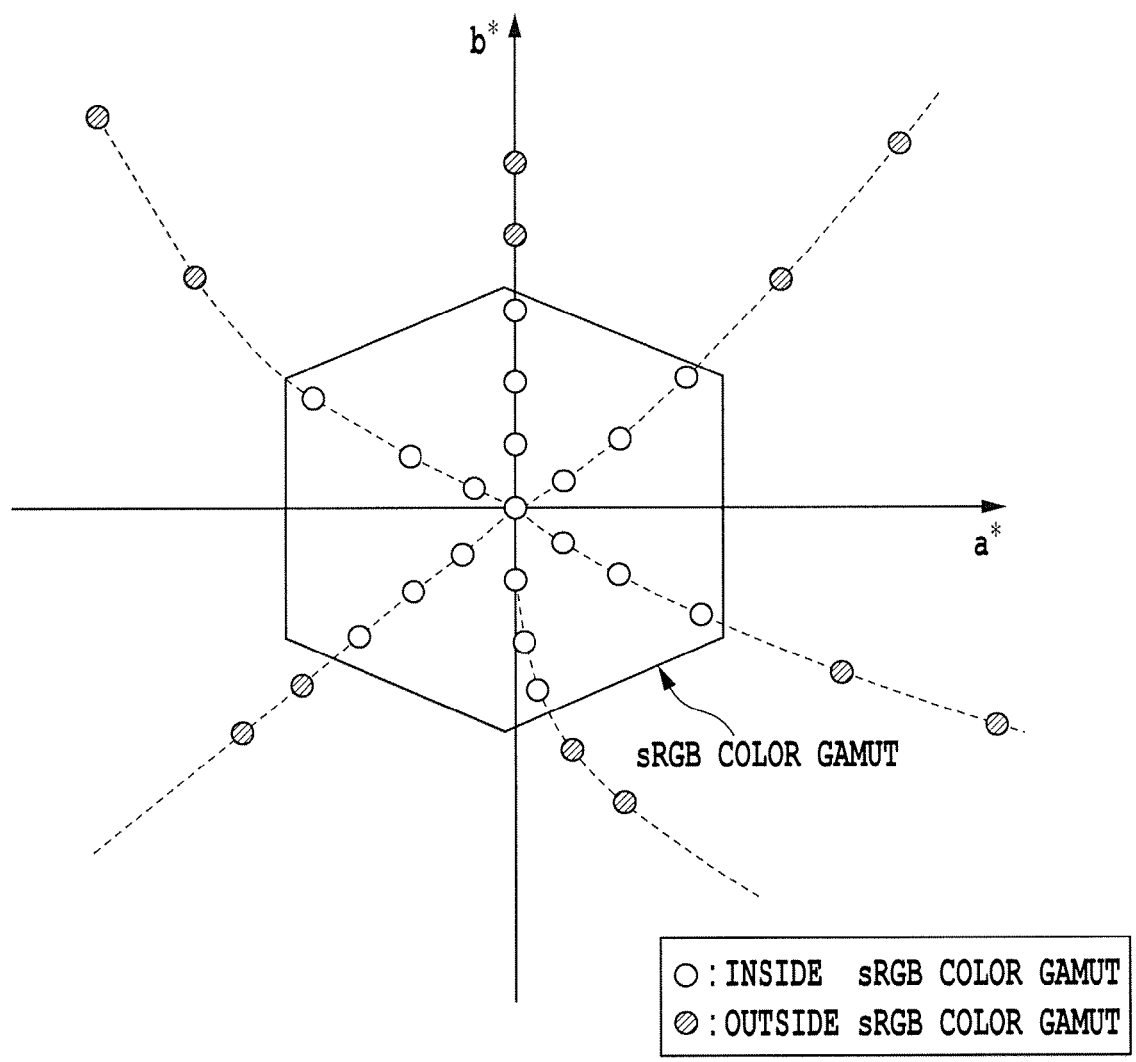
FIG. 10 is a view illustrating a method according to an embodiment of the present invention, for generating an LUT corresponding to Adobe RGB smoothly expanded from sRGB color gamut using a spline curve.

Here, in the above-mentioned algorithm, although data having highest saturation in the sRGB color gamut was focused attention, the present invention is not limited to this. For example, the way how hue, saturation and lightness are changed by color adjustment among a plurality of data on the same hue inside the sRGB color gamut, is memorized as data. From the data, an LUT corresponding to Adobe RGB can also be generated by representing the output value inside the sRGB color gamut using a spline curve etc., and by using a spline curve expanded toward the outside of the sRGB color gamut as the output value for data outside the sRGB color gamut. FIG. 10 is the conceptual view thereof.

As described above, a table defined in an expanded color space can be generated based on, for example, a color conversion table corresponding to color adjustment defined in the standard color space. As a result, in spite of not having performed color adjustment on an expensive display device corresponding to the expanded color space but having performed color adjustment on a display device corresponding to the standard color space, a color conversion table reflecting the conversion characteristic defined by the first color conversion table can be generated for an image in the expanded color space.

Second Embodiment

In the first embodiment, an example in which a user generates a three-dimensional LUT corresponding to the color space of sRGB by performing retouching by using photo retouch software is described. In the present embodiment, a user generates a three-dimensional LUT corresponding to the color space of sRGB by using the output of a printer having color conversion from which the user wants to imitate.

Figure 11:
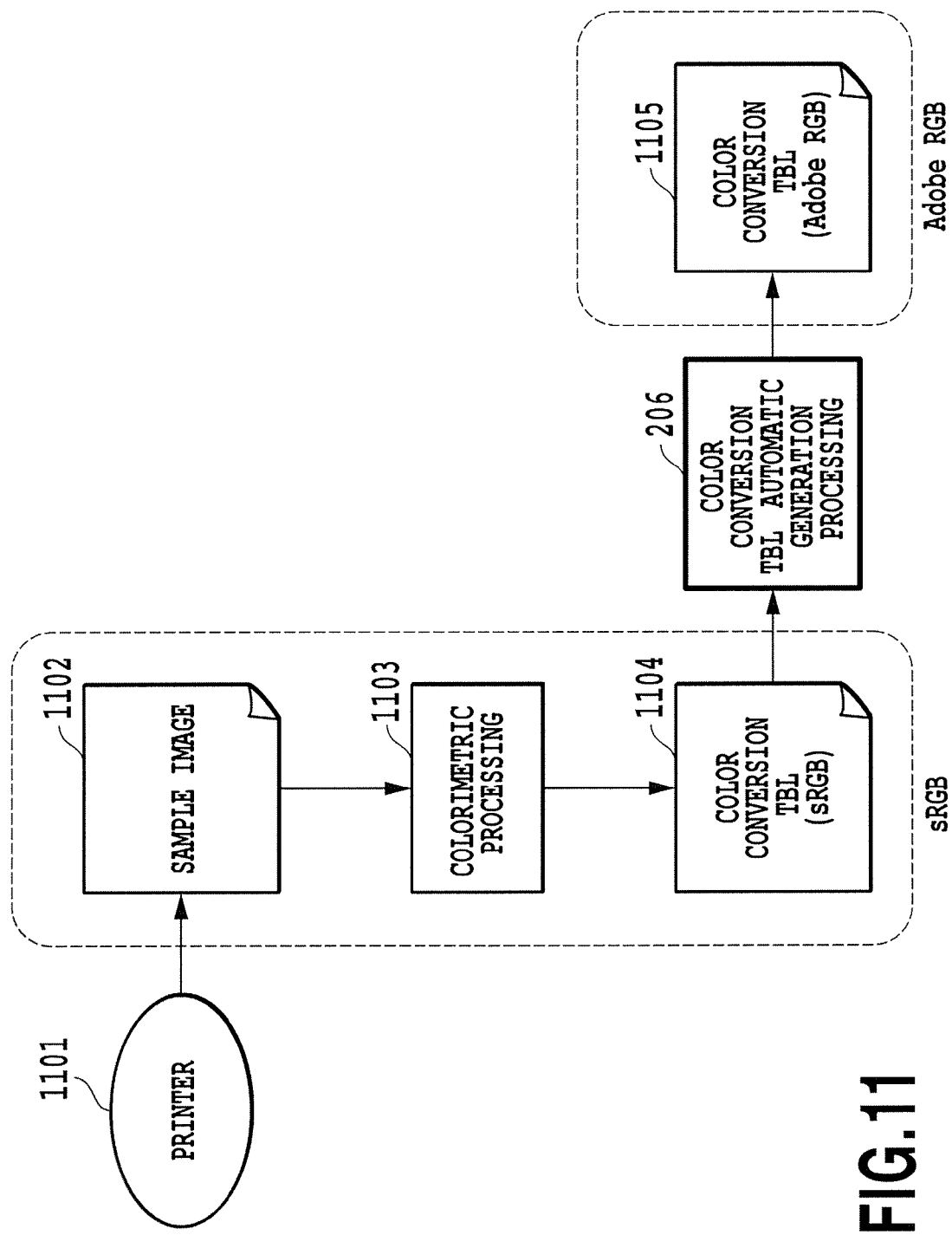
FIG. 11 is a schematic view of an image processing apparatus according to an embodiment of the present invention.

With reference to FIG. 11, processing from generation of the color conversion TBL supporting sRGB using to automatic generation of the color conversion TBL supporting Adobe RGB using a printer, will be described.

In FIG. 11, an image processing apparatus according to the present embodiment includes a calorimetric processing section 1103 and a color conversion table generation processing section 206. Reference numeral 1101 denotes a printer having color conversion from which the user wants to imitate and the printer is connected to the image processing apparatus according to the present embodiment. Reference numeral 1102 denotes a sample image (printed matter) output by the printer 1101. Here, in the sample image 1102 a color chart region for LUT is inserted.

In the present embodiment, the calorimetric processing section 1103 performs colorimetry of the color chart region for LUT of the sample image 1102 output from the printer 1101, and obtains the color chart data for LUT of the sample image 1102. Then, the calorimetric processing section 1103 associates color chart data for LUT of original electronic data (not illustrated in figures) of the sample image 1102 and color chart data for LUT of the sample image 1102 so that the color chart data for LUT of original electronic data of the sample image 1102 serves as the input, and the color chart data for LUT of the sample image 1102 serves as the output. In this way, the calorimetric processing section 1103 generates a color conversion TBL (sRGB) 1104 that is a color conversion table reflecting color conversion of the printer 1101 defined in the first color space.

The color conversion TBL (sRGB) 1104 generated in the colorimetric processing section 1103 is input into the color conversion table generation processing section 206, and in the same manner as that of the first embodiment, a color conversion TBL (Adobe RGB) 1105 that is a color conversion table defined in the second color space is generated.

As mentioned above, according to the present embodiment, since an image of a standard color space is used as the image on which color adjustment is performed when a display device corresponds to the standard color space, the result of the color adjustment can be confirmed on the display device, enabling intended color conversion to be performed easily. In addition, by generating a color conversion table in a standard color space on which the result of the color adjustment is reflected, color conversion can also be performed on an image in an expanded color space.

Moreover, for an input image in a color space that is different from the color space corresponding to an existing nonlinear color conversion table, a color conversion table corresponding to the different color space can also be generated by expandedly defining the existing nonlinear color conversion table. Therefore, color conversion that is substantially the same as that of the existing nonlinear color conversion table can also be performed on the input image in the different color space.

Other Embodiments

The present invention can also be applied to a system constituted by a plurality of devices (such as, for example, a computer, an interface device, a reader, and a printer), or can also be applied to an apparatus (such as a complex machine, a printer, or a facsimile machine) that is composed of one device.

A processing method in which a program for operating the configuration of the above-mentioned embodiments so as to achieve the function of the embodiment is recorded on a storage medium, and the program recorded on the storage medium is read out as a code and executed in a computer, is also included within the scope of the above-mentioned embodiments. In other words, a computer-readable storage medium is also included within the scope of an example. Moreover, not only the above-mentioned storage medium in which a computer program is recorded, but also the computer program itself is also included within the scope of the embodiments.

As such a storage medium, for example, a floppy disk, a hard disk, an optical disk, a magneto-optical disk, a CD-ROM, a magnetic tape, a non-volatile memory card, and a ROM can be used.

Moreover, not only the above-mentioned program that is recorded on the storage medium and executes processing by itself, but also a program that operates on an OS while cooperating with another software and the function of an extended board and executes the operation of the above-mentioned embodiments are also included within the scope of the embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-172761, filed Jun. 29, 2007, which is hereby incorporated by reference herein in its entirety.

What is claimed is:

1. An image processing method comprising:
    an image color adjustment processing step of performing predetermined color adjustment on image data in a first color space to generate a first color conversion table for converting image data in the first color space; and
        a color conversion table generation processing step of performing an expanded definition of the first color conversion table by using data contained in the first color space to generate a second color conversion table for performing predetermined color adjustment on image data in a second color space having a color gamut wider than that of the first color space based on said first color conversion table.

2. The image processing method according to claim 1, wherein said data is data on hue, saturation and lightness, and said color conversion table generation processing step performs analysis for said expanded definition for each of said hue, saturation and lightness.

3. The image processing method according to claim 1, further comprising an image color conversion processing step of applying said second color conversion table to image data in said second color space to perform said predetermined color conversion on the image data in said second color space.

4. The image processing method according to claim 1, wherein said image color adjustment processing step performs said predetermined color conversion in response to color adjustment by a user.

5. The image processing method according to claim 1, wherein the image data in the first color space is an image input before the image color adjustment processing step, and said image color adjustment processing step performs said predetermined color conversion so as to be close to an expression characteristic of a color of the image data in the first color space.

6. An image processing apparatus comprising:
    an image color adjustment unit configured to perform predetermined color adjustment on image data in a first color space to generate a first color conversion table for converting image data in the first color space; and
    a color conversion table generation unit configured to perform an expanded definition of the first color conversion table by using data contained in the first color space to generate a second color conversion table defined in a second color space for performing predetermined color adjustment on image data in a second color space having a color gamut wider than that of the first color space based on said first color conversion table.

7. The image processing apparatus according to claim 6, wherein said data is data on hue, saturation and lightness, and said color conversion table generation unit performs analysis for said expanded definition for each of said hue, saturation and lightness.

8. The image processing apparatus according to claim 6, further comprising an image color conversion unit configured to apply said second color conversion table to image data in said second color space to perform said predetermined color conversion on the image data in said second color space.

9. The image processing apparatus according to claim 6, wherein said image color adjustment unit performs said predetermined color conversion in response to color adjustment by a user.

10. The image processing apparatus according to claim 6, further comprising:
    an image input unit configured to receive image data in the first color space; wherein
    the image data in the first color space is an image output by an image forming apparatus that is different from said image processing apparatus; and
    said image color adjustment unit performs said predetermined color conversion so as to be close to an expression characteristic of a color of the image data in the first color space.

11. A non-transitory computer-readable storage medium storing a computer program, which when executed by the computer, causes the computer to perform:
    an image color adjustment processing step of performing predetermined color adjustment on an image in a first color space to generate a first color conversion table for converting image data in the first color space; and
    a color conversion table generation processing step of performing an expanded definition of the first color conversion table by using data contained in the first color space and generating a second color conversion table for performing predetermined color adjustment on an image in a second color space having a color gamut wider than that of the first color space based on said first color conversion table.

12. An image processing method, comprising:
    an image color adjustment step of measuring a color on a sample image which is outputted from a printer and associating original sample data with a color chart data of the measured sample image to generate a first color conversion table for converting image data in a first color space; and
    a color conversion table generation processing step of performing an expanded definition of the first color conversion table by using data contained in the first color space to generate based on said first color conversion table a second conversion table for converting image data in a second color space having a color gamut wider than that of the first color space.

13. The image processing method according to claim 12, wherein the first color space is sRGB, and the second color space is Wide Gamut RGB or Adobe RGB.

14. The image processing method according to claim 1, wherein the first color space is sRGB, and the second color space is Wide Gamut RGB or Adobe RGB.

15. The image processing apparatus according to claim 6, wherein the first color space is sRGB, and the second color space is Wide Gamut RGB or Adobe RGB.

16. An image processing apparatus, comprising:
    an image color adjustment means for measuring a color on a sample image which is outputted from a printer and associating original sample data with a color chart data of the measured sample image to generate a first color conversion table for converting image data in a first color space; and
    a color conversion table generation processing unit configured to perform an expanded definition of the first color conversion table by using data contained in the first color space to generate, based on the first color conversion table a second conversion table for converting image data in a second color space having a color gamut wider than that of the first color space.

17. The image processing apparatus according to claim 16, wherein the first color space is sRGB, and the second color space is Wide Gamut RGB or Adobe RGB.

18. An image processing apparatus comprising:
a color conversion unit configured to perform color conversion on image data in a second color space by using a second color conversion table;
an output unit configured to output to an image output device the image data in the second color space which is converted by the color conversion unit, wherein the second color conversion table is generated by performing predetermined color adjustment on image data in a first color space to generate a first color conversion table for converting image data in the first color space and performing an expanded definition of the first color conversion table by using data contained in the first color space to generate, based on said first color conversion table, a second color conversion table for performing predetermined color adjustment on image data in a second color space having a color gamut wider than that of the first color space.

19. The image processing method according to claim 18, wherein the first color space is sRGB, and the second color space is Wide Gamut RGB or Adobe RGB.

20. An image processing method in an image processing apparatus, the method comprising the steps of performing color conversion on image data in a second color space by using a second color conversion table, wherein
the image processing apparatus comprising the second color conversion table which is generated by performing predetermined color adjustment on image data in a first color space to generate a first color conversion table for converting image data in the first color space, and performing an expanded definition of the first color conversion table by using data contained in the first color space to generate, based on said first color conversion table, a second color conversion table for performing predetermined color adjustment on image data in a second color space having a color gamut wider than that of the first color space.

21. The image processing method according to claim 20, wherein the first color space is sRGB, and the second color space is Wide Gamut RGB or Adobe RGB.

22. The image processing method according to claim 20, further comprising the step of outputting to an image output device the image data in the second color space which is converted in the color conversion step.

* * * * *